July 12, 1949. K. HENRICKSEN ET AL 2,475,836
OIL PAN MOUNTING FOR MOTOR VEHICLES
Filed May 23, 1946
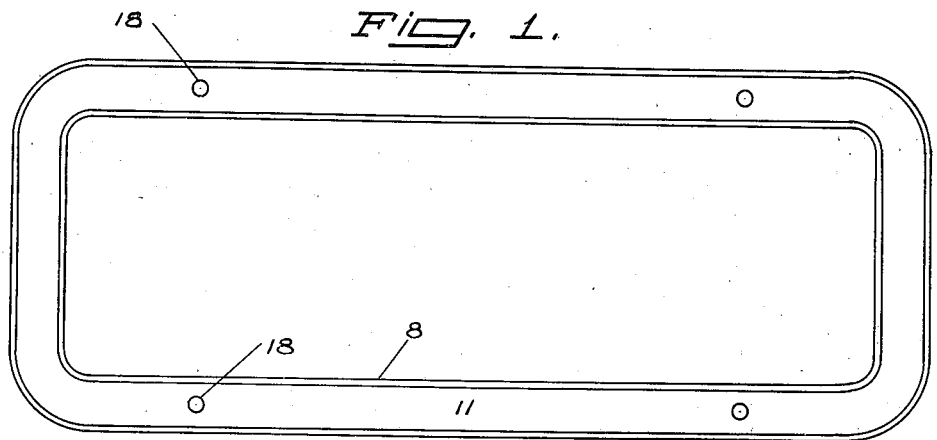
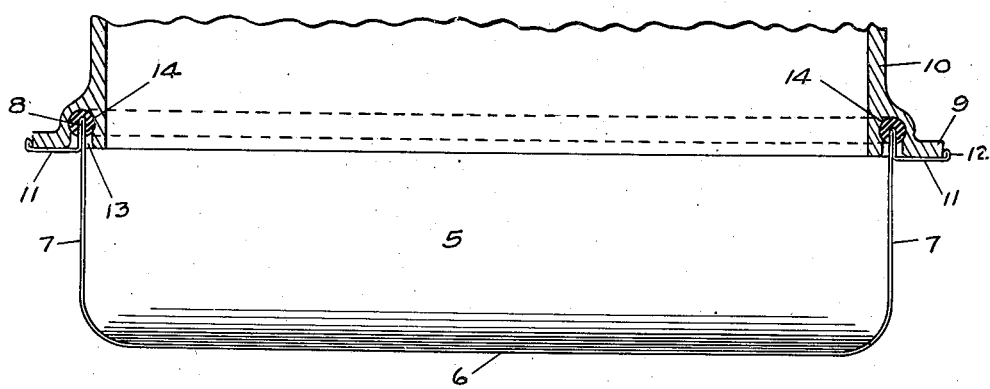
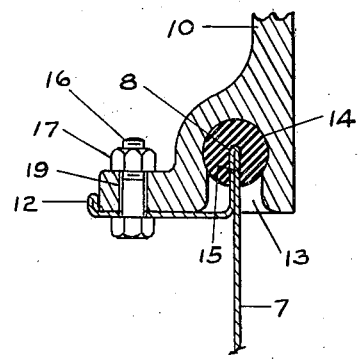
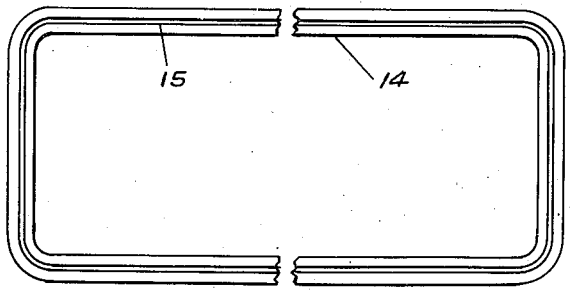
INVENTORS
KENNETH HENRICKSEN
WALTER P. HENRICKSEN
BY Edward C. Healy
ATTORNEY Patented July 12, 1949

2,475,836

UNITED STATES PATENT OFFICE 2,475,836

OIL PAN MOUNTING FOR MOTOR VEHICLES

Kenneth Henricksen and Walter P. Henricksen, Petaluma, Calif.

Application May 23, 1946, Serial No. 671,887

2 Claims. (Cl. 121—194)

This invention relates to improvements in oil pan mountings for motor vehicles and has particular reference to a special construction and means for sealing the oil pan to the motor block.

The present method employed for sealing the oil pan to the motor block in motor vehicles consists in providing flanges on both of the said members and interposing a gasket in between the said flanges and substantially tightening the said parts together by a plurality of bolts spaced approximately three inches apart. In order to provide and maintain the proper seal to insure against leakage it is necessary to space the bolts close together requiring as many as twenty or more bolts and nuts for the average assembly. A disadvantage with the said construction is the tremendous labor required to assemble and dismantle the oil pan from the motor block. As it is often necessary to remove the oil pan from the motor block when repairing the motor or vehicle and for other various reasons, the cost involved for the labor required is extremely expensive. Furthermore the seal is dependent entirely on maintaining the horizontal tightness of the said flanges and gasket and when any of the nuts become loose the proper seal is immediately lost.

It is the primary object of the present invention to improve oil pan mountings for motor vehicles by sealing the parts vertically in a manner that will not be dependent on the bolts and nuts to maintain the proper seal, whereby only a few bolts are necessary in the complete assembly, thus greatly reducing the cost for the labor required for dismantling and re-assembling the parts together.

Another object of the present invention is to form a circular groove into and around the flange of the motor block and to provide a circular resilient slotted gasket therein and to insert the entire upper edge of the oil pan into the said slotted gasket, whereby the oil pan is completely sealed.

A further object of the present invention is to provide a device of the character described that is durable, simple in construction, inexpensive to manufacture and positive in operation.

Other objects and advantages will be apparent during the course of the following description.

In the accompanying drawing forming a part of the specification, in which, for the purpose of illustration, like numerals designate like parts throughout the same.

Fig. 1 is a top plan view of the improved oil pan.

Fig. 2 is a central vertical longitudinal sectional view of the oil pan and a fragment of the grooved motor block and the slotted washer therein for receiving and sealing the upper marginal edge of the pan, Fig. 3 is an enlarged fragmentary sectional view illustrating the principle of the invention, and Fig. 4 is a bottom plan view of the resilient washer that is provided in the grooved flange of the motor block.

Referring in detail to the drawing and the different parts thereof, the numeral 5 designates, as a whole, the improved oil pan preferably formed of sheet metal and having a bottom 6 and upwardly extending sides 7, which sides are preferably folded over and upon themselves as at their upper extremities indicated at 8 and extend downwardly therefrom to the bottom face of the flange 9 of the motor block 10 and thence outwardly forming a flange as at 11 that extends to and beyond the said motor block flange 9 as illustrated in Figs. 2 and 3. The outer extremity of the oil pan flange 11 is preferably folded over and extends upwardly as at 12 to reinforce the same.

A groove 13 is cast or otherwise formed into the bottom face of the motor block 10 to accommodate a round resilient gasket 14 made of rubber or any other suitable material which gasket is inserted into the said groove as shown in Figs. 2 and 3. It will be noted that the upper portion of the said groove is of circular formation to conform with the gasket and the lower open portion is of a width which is slightly less than the diameter of the circular portion. The said construction is provided to cause the gasket to have a better seal, the said gasket having sufficient resiliency and flexibility to enable it to be properly positioned within the groove. The said groove and gasket has the same general contour as the edge portion 8 of the oil pan and is provided with a slot 15 for receiving the said upper edge portion of the pan, forming a tight seal therewith. The outer portion of the said groove 13 may have any suitable width.

From the foregoing description taken in conjunction with the accompanying drawing, it will be observed that the resilient gasket 14 provides a tight seal in the groove 13 and also that the upper marginal edge portion 8 of the oil pan is tightly sealed within the gasket, thus providing a positively sealed joint for preventing leakage of oil from the pan 5. Four bolts and nuts 16 and 17, respectively, are all that is required for securing the oil pan to the motor block. Suitable holes 18 and 19 are provided in the oil pan and motor block respectively for accommodating the said bolts.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:

1. An oil pan mounting of the character described for motor vehicles comprising, a motor block, an arc-shaped groove formed into and around the bottom face of the motor block, a resilient gasket capable of conforming to the shape of said groove mounted therein, a vertical slot formed into and around said gasket, and an oil pan having vertical walls capable of extending into the said vertical slot in the said resilient gasket and be sealed therein for preventing leakage of oil from the pan.

2. An oil pan mounting for motor vehicles comprising, a motor block, a horizontal flange formed on and around the body thereof, a groove having an upper arc-shaped form provided into and around the bottom face of the motor block, a resilient gasket of circular configuration capable of tightly fitting into the said groove mounted therein, the said groove having a reduced opening of narrower width than the thickness of the gasket for retaining the gasket in the groove, a vertical slot formed into and around the gasket, an oil pan having vertical walls capable of tightly fitting in the said vertical slot in the resilient gasket for preventing leakage of oil from the pan, a horizontal flange extending around the upper portion of the said vertical walls of the oil pan and adapted to fit and overlap the flange of the motor block, and means for securing the flanges one to the other.

KENNETH HENRICKSEN.
WALTER P. HENRICKSEN.

REFERENCES CITED

The following references are of record in the file of this patent:

UNITED STATES PATENTS

| Number | Name | Date |
| --- | --- | --- |
| 943,408 | Heinze | Dec. 14, 1909 |
| 1,135,524 | Hewitt | Apr. 13, 1915 |
| 1,753,129 | Molden | Apr. 1, 1930 |
| 2,002,211 | Torney | May 21, 1935 |